United States Patent
Miller

(10) Patent No.: US 10,719,901 B2
(45) Date of Patent: Jul. 21, 2020

(54) SYSTEMS AND METHODS FOR FUELING MOTOR VEHICLES

(71) Applicant: MOBILE FUELING SOLUTIONS, LLC, Albuquerque, NM (US)

(72) Inventor: Nicholas S. Miller, Santa Fe, NM (US)

(73) Assignee: Mobile Fueling Solutions, LLC, Albuquerque, NM (US)

( * ) Notice: Subject to any disclaimer, the term of this patent is extended or adjusted under 35 U.S.C. 154(b) by 170 days.

(21) Appl. No.: 15/898,693

(22) Filed: Feb. 19, 2018

(65) Prior Publication Data

US 2018/0247260 A1 Aug. 30, 2018

Related U.S. Application Data

(63) Continuation of application No. 14/526,178, filed on Oct. 28, 2014, now Pat. No. 9,947,063.

(60) Provisional application No. 61/896,273, filed on Oct. 28, 2013.

(51) Int. Cl.
*G06Q 50/30* (2012.01)
*G08G 1/00* (2006.01)
*G07C 5/00* (2006.01)

(52) U.S. Cl.
CPC ............. *G06Q 50/30* (2013.01); *G08G 1/202* (2013.01); *G07C 5/008* (2013.01)

(58) Field of Classification Search
CPC ......... G06Q 50/30; G08G 1/202; G07C 5/008
USPC ........................................................ 705/332
See application file for complete search history.

(56) References Cited

U.S. PATENT DOCUMENTS

| 6,024,142 A | 2/2000 | Bates |
| 6,112,152 A | 8/2000 | Tuttle |
| 6,338,008 B1 | 1/2002 | Kohut et al. |
| 6,390,151 B1 | 5/2002 | Christman et al. |
| 7,174,243 B1 | 2/2007 | Lightner et al. |

(Continued)

OTHER PUBLICATIONS

Lipman, Timothy E., "Opportunities for Integrating Hydrogen-Powered Vehicles and Intelligent Transportation Systems: Analysis of "Smart Refueling" to Optimize Hydrogen Infrastructure," University of California—Davis, Oct. 2006, pp. 2-4, 6. (Year: 2006).*

(Continued)

*Primary Examiner* — George Chen
*Assistant Examiner* — Hunter A Molnar
(74) *Attorney, Agent, or Firm* — Luis M. Ortiz; Kermit D. Lopez; Ortiz & Lopez, PLLC

(57) ABSTRACT

Methods and systems can automate the delivery of motor vehicle fuel while reducing the need for operator involvement and driving to a gas station. A server with access to a database and in wireless communication with computers installed in a motor vehicle can collect data from the computers including vehicle fuel level and vehicle geographic location. The data can be compared to the data to a fuel level threshold and geographic boundary. The data can be transmitted wirelessly through a wireless network to the database. A mobile fuel tanker truck can be dispatched to the vehicle's location when at least one of: fuel service is requested by a user of the vehicle or the vehicle's fuel level falls beneath the fuel level threshold. Fuel service can be requested by a user via a smartphone running an application that enables the monitoring, management, selection, and ordering of fuel service.

20 Claims, 8 Drawing Sheets

(56) References Cited

U.S. PATENT DOCUMENTS

| | | |
|---|---|---|
| 7,412,313 B2 | 8/2008 | Isaac |
| 7,477,968 B1 | 1/2009 | Lowrey et al. |
| 8,176,931 B1 | 5/2012 | Cajiga et al. |
| 8,452,486 B2 | 5/2013 | Banet et al. |
| 8,523,070 B2 | 9/2013 | Gulli |
| 8,538,591 B1 | 9/2013 | Klughart |
| 2003/0069684 A1 | 4/2003 | Reimer |
| 2006/0293849 A1 | 12/2006 | Baldwin |
| 2009/0000375 A1* | 1/2009 | Johnson ................ G01F 23/363 73/317 |
| 2009/0005902 A1 | 1/2009 | Megiddo |
| 2009/0094085 A1* | 4/2009 | Kantarjiev ............. G06Q 10/06 705/7.13 |
| 2010/0306078 A1* | 12/2010 | Hwang .................. G06Q 30/02 705/26.1 |
| 2011/0305232 A1* | 12/2011 | Singamsetty ........ H04B 1/7143 370/338 |
| 2012/0191289 A1* | 7/2012 | Guo ................... G01C 21/3697 701/29.1 |
| 2012/0223829 A1* | 9/2012 | Tyler ..................... G08G 1/207 340/450.2 |
| 2013/0226443 A1* | 8/2013 | Scofield .............. B60R 16/0232 701/123 |
| 2013/0282500 A1* | 10/2013 | Latorre .................. G06Q 20/20 705/17 |
| 2014/0077936 A1* | 3/2014 | Brown ................... H04W 4/21 340/10.5 |
| 2014/0129379 A1* | 5/2014 | Tryba .................... G06Q 30/04 705/26.8 |
| 2015/0352947 A1 | 12/2015 | Hubschman et al. |

OTHER PUBLICATIONS

U.S. Appl. No. 14/526,178; Information Disclosure Statement; Oct. 28, 2014.

U.S. Appl. No. 14/526,178; Notice of Reference Cited; Nov. 22, 2017.

U.S. Appl. No. 14/526,178; Notice of Reference Cited; Sep. 1, 2017.

U.S. Appl. No. 14/526,178; Notice of Reference Cited; Jan. 18, 2017.

* cited by examiner

SYSTEMS AND METHODS FOR FUELING MOTOR VEHICLES

CROSS-REFERENCE TO PATENT APPLICATION

This patent application is a continuation of U.S. patent application Ser. No. 14/526,178, entitled "Systems and Methods for Fueling Motor Vehicles," which was filed on Oct. 28, 2014 and is incorporated herein by reference in its entirety. U.S. patent application Ser. No. 14/526,178 in turn claims priority under 35 U.S.C. 119(e) to U.S. Provisional Patent Application Ser. No. 61/896,273, entitled "Systems and Methods for Fueling Motor Vehicles," which was filed on Oct. 28, 2013, the disclosure of which is also incorporated herein by reference in its entirety. This application therefore claims the benefit of and priority to U.S. Provisional Patent Application Ser. No. 61/896,273 and its priority date of Oct. 28, 2013.

FIELD OF THE INVENTION

Embodiments of the present invention relate to fueling motor vehicles, specifically to improved systems and methods for ordering, managing, refueling vehicles when a quantity of fuel in a fuel tank has been consumed, and further, to a mobile logistics system for refueling private vehicles despite their location.

BACKGROUND

The fueling of motor vehicles generally relies on the presence of stationary fueling sites (e.g., commercial gas stations, private fuel dispensing sites). These fueling sites typically receive and store large quantities of fuel in onsite underground tanks. Fuel is delivered to the tanks by means of established supply chains involving refineries, bulk supply terminals, and fuel tanker trucks.

In a typical scenario, a motor vehicle in need of fuel must be transported to a stationary fueling site in order to refuel. The refueling process involves exiting the vehicle, processing a form of payment, and manually pumping fuel from an underground storage tank to the vehicle's fuel tank.

The refueling process, moreover, is widely considered to be a disagreeable experience. It requires a vehicle operator to take time away from other activities, travel to a designated location, brave the elements, and handle frequently used equipment. Fueling stations are often dirty, tend to attract a disproportionate amount of crime, and can negatively impact the environment. Even in the commercial fleet context where private fueling sites are prevalent, the refueling process is problematic. Vehicle operators are usually "on the clock" during the refueling trip and fleet managers often experience problems of fuel theft by both employees and nonemployees.

BRIEF SUMMARY

In response to these concerns, there is a need to transform the refueling process itself. Present solutions fail to address a central problem: the need to physically transport a motor vehicle to a stationary fueling site in order to refuel. There is thus a present need for an improved system and method for refueling motor vehicles without having to transport the vehicle to a fueling site. There is further a need for a system and method that addresses the other shortcomings of known systems, including:

Eliminating the need for a vehicle operator to locate a stationary fueling site within an acceptable distance from a vehicle to be refueled.

Eliminating the need for the operator to locate a fueling site that is pricing fuel at an acceptable level.

Eliminating the need for the operator to take time away from other activities in order to transport the vehicle to and from the fueling site.

Eliminating the need for the operator to brave the elements and handle frequently used equipment.

Eliminating the need for the operator to expose himself or herself to a dangerous environment.

Eliminating the requirement for the operator to patronize a business that may negatively affect the environment.

Eliminating the need for a business owner to compensate an employee-operator during the refueling of a fleet vehicle.

Eliminating the need for a fleet manager to guard against theft and fraud associated with refueling.

Allowing for more flexible fuel pricing strategies (e.g., volume/time/location based pricing, spot-market and futures-market based pricing).

Allowing for fuel price hedging opportunities.

A system in accordance with features of the present invention can take many forms. In one embodiment, a system can be provided for automating the delivery of motor vehicle fuel wherein the need for operator involvement is eliminated. Specifically, in one embodiment, a system can be provided for collecting a vehicle's fuel and location data, comparing the data to a fixed or variable geographic boundary, transmitting the data through a network to an Internet-connected database, and dispatching a mobile fuel tanker truck to the vehicle's location.

In another aspect, this application can provide a system for placing one-off orders for the delivery of motor vehicle fuel. Specifically, one embodiment can utilize a telecommunication technology, such as a smartphone within and/or otherwise associated with a vehicle and a mobile software application installed on the smartphone. The application can preferably monitor the vehicle's location, alert the operator when the vehicle is within range of mobile fuel service, and provide the user with the ability to place a fuel order.

Another feature of the present invention can provide a system for determining a vehicle's fuel level and transmitting the information, which can optionally be done via a short-range wireless connection, to a smartphone located in and/or near the vehicle. A mobile software application installed on the smartphone can enable the delivery of fuel by uploading the information along with location data to an Internet-connected database.

Yet another feature of the present invention can provide a mobile mesh network. Specifically, there can be a system for transmitting and receiving information between multiple vehicles, stationary network nodes, and a network coordinator.

In another aspect, the invention can provide a mobile geographic boundary. Specifically, there can be a system for varying a geographic boundary in connection with the location of a mobile fuel tanker truck, transmitting the changing boundary coordinates, and interacting with a vehicle or a vehicle operator based on proximity.

In one feature, the present invention can relate to a system that allows for a more flexible approach to fuel pricing. In particular, the system can allow for continuous price adjustment based on situation-specific factors (e.g., volume) and real-time market factors (e.g., spot prices).

In another feature of the present invention, fuel price hedging opportunities are provided. Specifically, systems and methods can allow for the purchase of fuel for future consumption, at present prices, using an online interface and a personalized fuel bank.

A method in accordance with features of the present invention can incorporate some, or all, of the following steps:

Determining a vehicle's fuel level;
Determining the vehicle's location;
Comparing the vehicle's location to a fixed or variable geographic boundary;
Transmitting the fuel level and location data to an Internet-connected database;
Analyzing the data in conjunction with other variables and generating instructions;
Transmitting the instructions to a mobile fuel tanker trunk;
Driving the fuel tanker trunk to the vehicle;
Unlocking and/or opening the vehicle's fuel door;
Dispensing a quantity of fuel in the vehicle's fuel tank; and
Relaying the quantity of fuel consumed back to the database for bill processing.

Aspects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention.

BRIEF DESCRIPTION OF THE SEVERAL VIEWS OF THE FIGURES

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION

Figure 1:
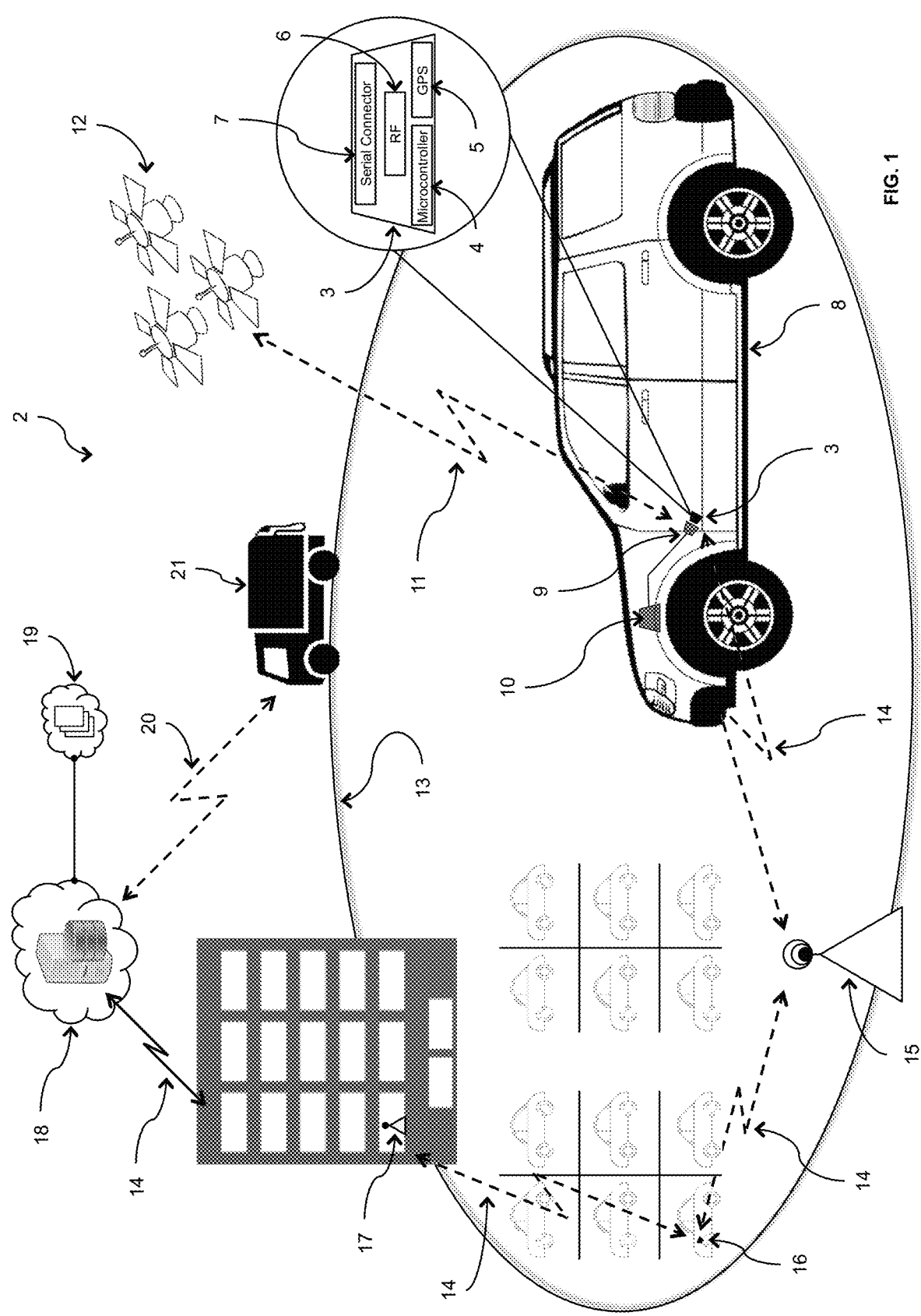
FIG. 1 illustrates a generalized system overview of features of the present invention.

FIG. 1 shows a schematic drawing of system 2 for automating the delivery of motor vehicle fuel wherein the need for operator involvement is eliminated. Specifically, wireless appliance 3 including microcontroller 4, GPS chipset 5, radio frequency transceiver 6, and serial connector 7 plugs into on-board diagnostics ("OBD-II") port 9 of vehicle 8. The OBD-II port 9 is a 16-pin serial interface on all light-duty vehicles manufactured after 1996 and a 6-pin serial interface on medium and heavy-duty vehicles. The port 9 is typically located underneath the steering column and provides access to the vehicle's engine control unit 10, which monitors over one hundred vehicle parameters, including fuel level. Fuel level is typically communicated to the engine control unit 10 by means of an electric signal from the fuel level sensor (not shown). The fuel level sensor uses a variable resistor to change the voltage of the signal in response to the movement of a mechanical float located in the fuel tank.

In one embodiment, wireless appliance 3 preferably solicits fuel level information from the vehicle's engine control unit 9 by determining the appropriate OBD-II communication protocol and broadcasting the appropriate parameter ID. The solicitation most preferably occurs periodically. When fuel level drops below an established threshold, GPS chipset 5 can activate and begin collecting radio frequency location data 11 from orbiting satellites 12 (in other embodiments, GPS chipset 5 continually records location data 11).

Microcontroller 4 preferably compares the GPS data 11 to the coordinates of a fixed or variable geographic boundary 13 stored in memory. If the vehicle is within geographic boundary 13, radio frequency transceiver 6 can begin transmitting real-time fuel level and location data 14 to nodes 15 and 16 in a mesh network (in other embodiments, transceiver 6 can broadcast data 14 more frequently or continuously). Nodes can be stationary transceivers positioned around geographic boundary 15 or mobile transceivers embedded in the wireless appliances of other vehicles participating in system 16. Nodes 15 and 16 preferably backhaul data 14 to network coordinator 17 serving as gateway. Network coordinator 17 uploads data 14 to the Internet. The data is preferably stored in an Internet-connected database managed by a host computer 18. Software running on the host computer 18 preferably causes the computer to analyze the data in conjunction with other variables 19 (e.g., retail/spot/futures market prices, system load, inventory level) and applies scheduling and pricing algorithms to generate instructions 20.

Instructions 20 can be transmitted to one or more mobile fuel tanker trucks 21 in communication with the host computer 18. The instructions 20 may include, but are not limited to, driving directions, routing sequences, vehicle identity information, fuel grade information, and pricing information. An operator of tanker truck 21 preferably drives to the location of vehicle 8, verifies the identity of vehicle 8, and opens the fuel door and dispenses fuel into the fuel tank of vehicle 8. Some vehicles have either electronic or mechanical fuel door locking mechanisms. In one embodiment, electronic mechanisms can optionally be unlocked by broadcasting the appropriate code from the wireless appliance 3 to the OBD-II system. Mechanical fuel doors can optionally be unlocked by means of a handheld apparatus inserted along the door's edge. After fuel is discharged, the quantity of fuel consumed is preferably recorded and relayed back to host computer 18 for bill processing.

Communication between wireless appliance 3 and host computer 18 can also run in the opposite direction. Specifically, host computer 18 can optionally transmit data through the network and back to wireless appliance 3 for several purposes, including modifying the geographic boundary of the coordinates stored in memory, troubleshooting problems, and changing program settings (e.g., time delays and transmission schedules).

Figure 2:
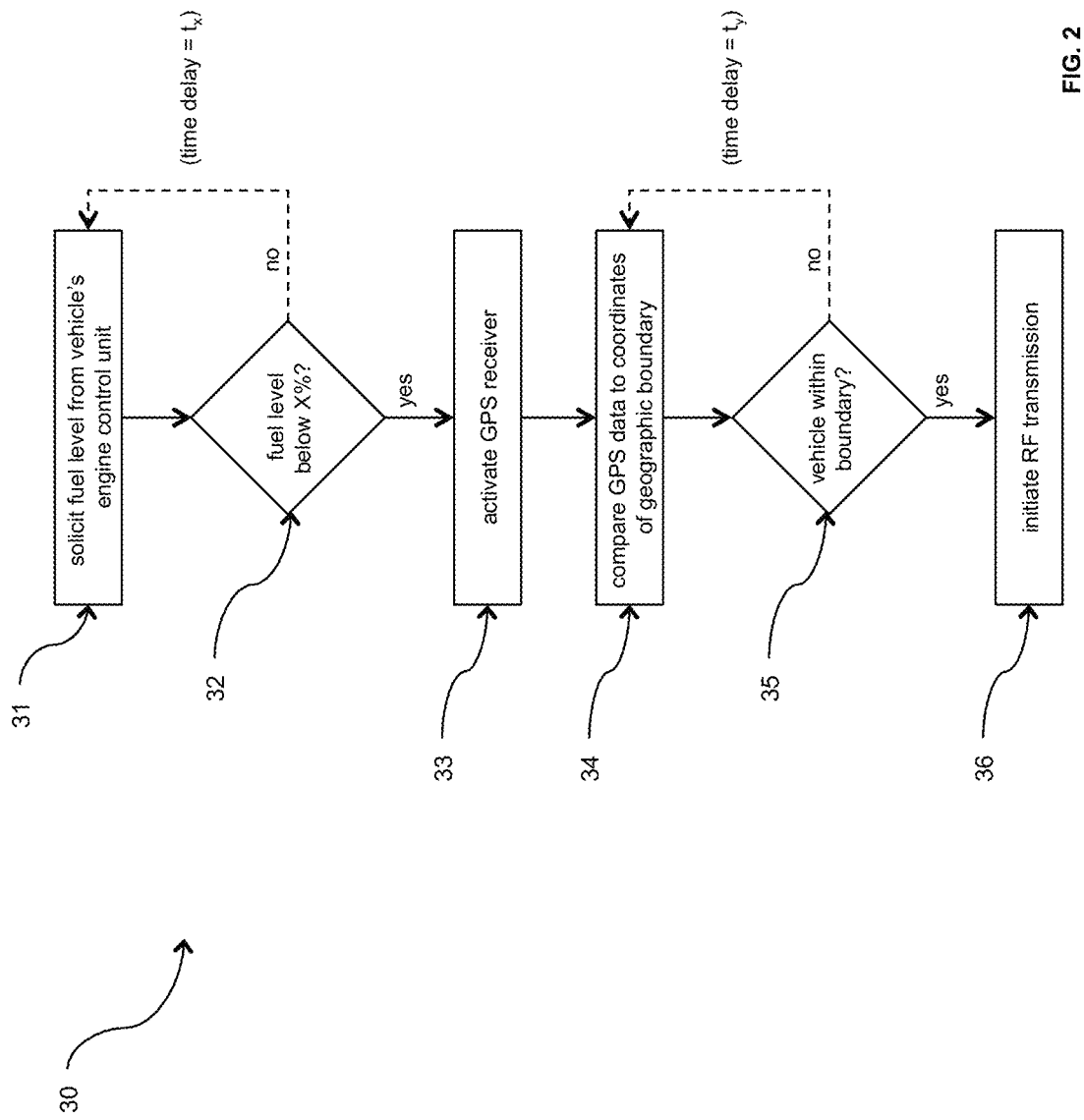
FIG. 2 illustrates a generalized partial flow chart of a feature of the present invention.

FIG. 2 shows in more detail how fuel level and location data can optionally be processed. Specifically, the FIG. 2 illustrates a flow chart of algorithm 30 used by the above-described system to solicit fuel level data and initiate location gathering and data transmission functions when appropriate. Steps 31 and 32 solicit vehicle fuel level information and compare the information to a pre-determined threshold. If fuel level is above the threshold, the solicitation reoccurs after a time delay. If fuel level is below the threshold, step 33 activates the GPS receiver and begins collecting location data. While it is also possible for the GPS receiver to continually collect location data, selectively activating the receiver in this way may help address end user privacy concerns. Steps 34 and 35 compare the GPS location data to the coordinates of a geographic boundary. If the vehicle is not within the boundary, the comparison reoccurs after a time delay. If the vehicle is within the boundary, step 36 broadcasts the fuel level and location data over a radio frequency.

Figure 3:
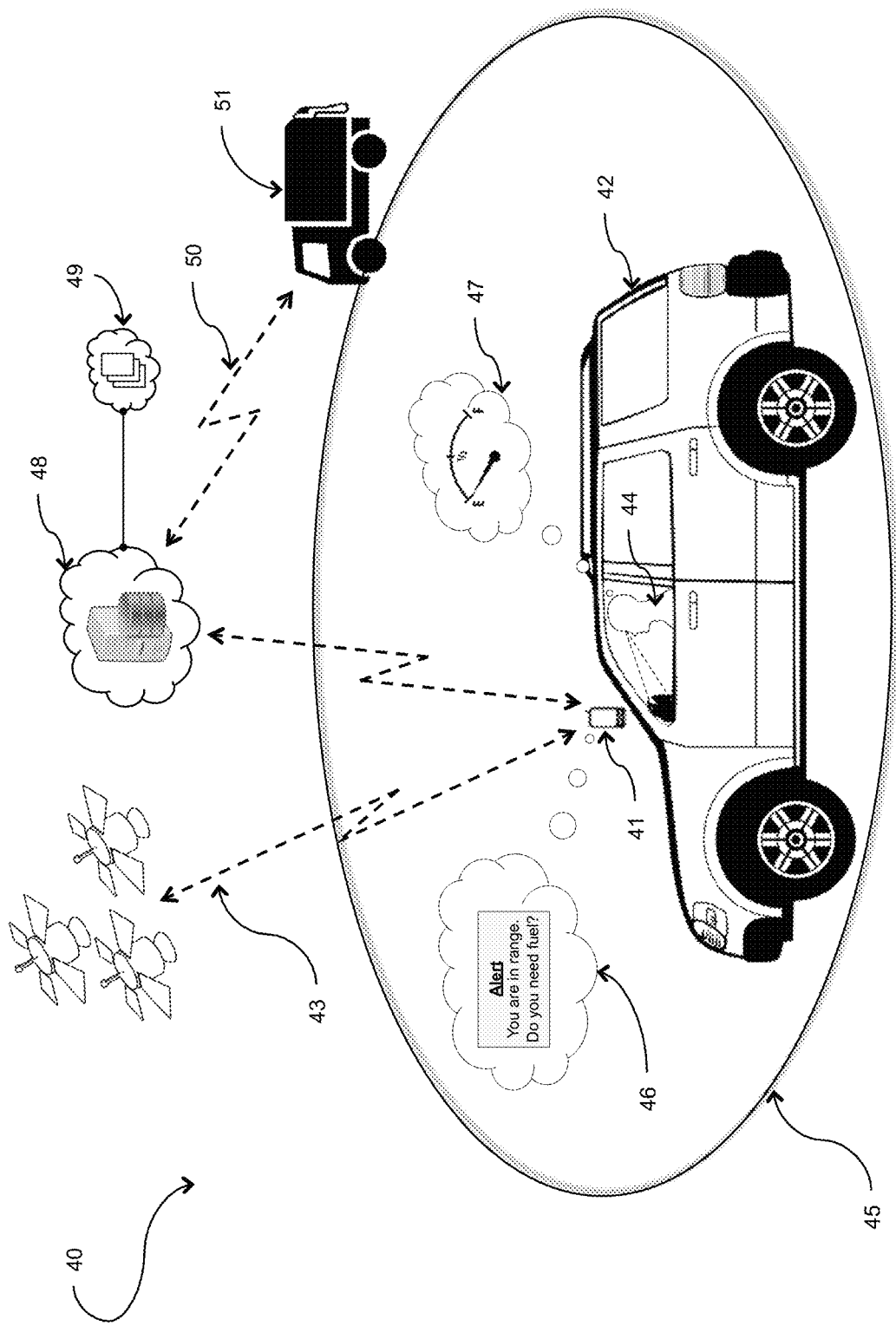
FIG. 3 illustrates a generalized system overview of alternative features.

FIG. 3 shows a schematic drawing of a system 40 for placing one-off orders for the delivery of fuel. The system optionally relies on the presence of a smartphone 41 within or near vehicle 42 and uses the smartphone's native hardware to receive and analyze GPS location data 43. When a vehicle operator 44 drives within a fixed or variable geographic boundary 45, a mobile software application (not shown) loaded in the operator's 44 smartphone 41 activates an alert message 46. The alert message 46 prompts the operator 44 to visually check the vehicle's 42 fuel level 47. If fuel level 47 is low, operator 44 can place a fuel order—optionally this can be set to occur when vehicle 42 is parked. When a fuel order is placed, smartphone's 41 cellular radio preferably transmits location data to an Internet-connected database managed by host computer 48. As in the previous embodiment, software on host computer 48 accesses other variables 49, then generates and transmits instructions 50 to mobile fuel tanker truck 51.

There are multiple alternatives to the system illustrated in FIG. 3. For example, a simpler version of the wireless appliance described above can include no GPS chipset and can replace the radio frequency transceiver with a Bluetooth radio. The appliance can optionally determine fuel level as described above, and then transmit the fuel level data via the Bluetooth radio to a smartphone located in and/or near a vehicle. A software application in the smartphone can automatically upload the fuel level data, along with location data derived from the smartphone's GPS chipset, to an Internet-connected database. The system can automate the delivery of fuel or require involvement from the vehicle operator.

Figure 4:
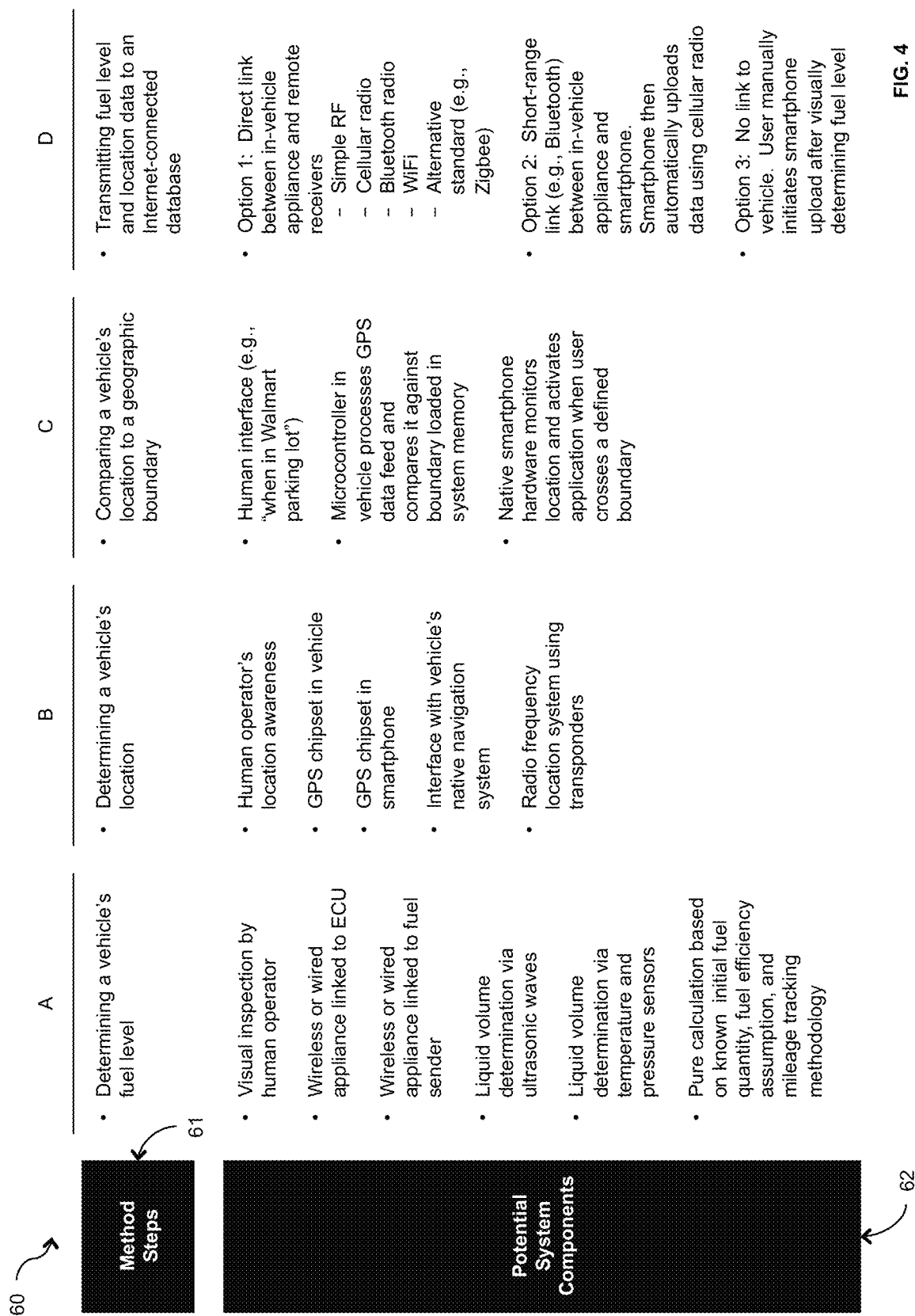
FIG. 4 is a table which illustrates potential system combinations.

FIG. 4 shows a table 60 listing some method steps 61 along with potential system components 62 that can be used to accomplish steps 61. The purpose of table 60 is to provide an overview of the various options available for piecing together a working system.

Figure 5:
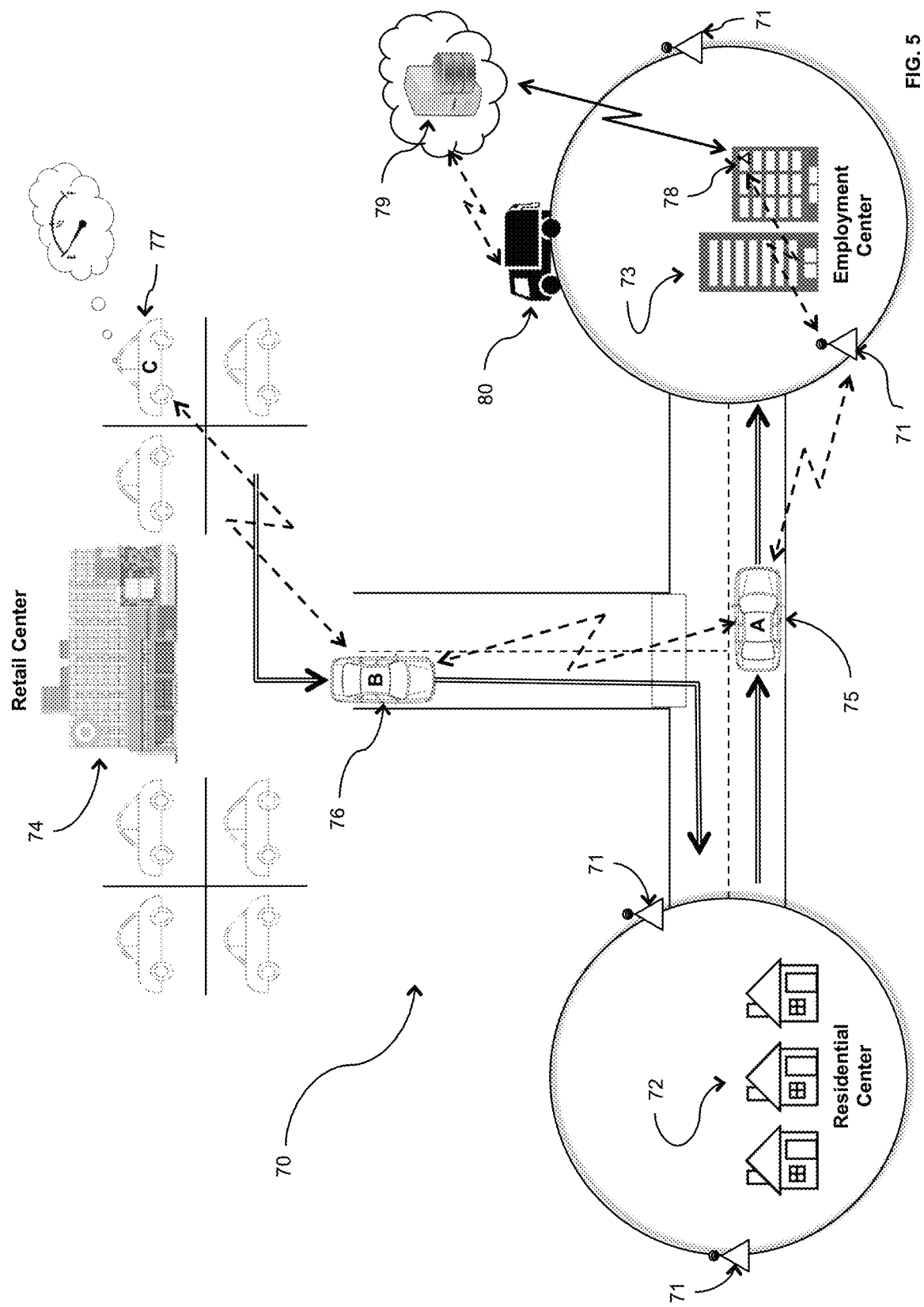
FIG. 5 illustrates a generalized system overview of a mobile mesh network.

FIG. 5 illustrates a schematic drawing of mesh network 70 in operation. Specifically, the drawing shows how mesh network 70 can be used to enlarge a fuel delivery service area without the need to install stationary network nodes 71 throughout the entire service area. Three zones are illustrated: a residential center 72, an employment center 73, and a retail center 74. The residential center 72 and the employment center 73 are surrounded by stationary network nodes 71, while the retail center 74 is not. Vehicle 75 is driving from the residential center 72 to the employment center 73. Vehicle 76 is driving from the retail center 74 to the residential center 72. Vehicle 77 is parked at the retail center 74 and is low on fuel. Vehicles 75, 76, 77 are all equipped with wireless appliances (not shown) as described above.

In a traditional hub-and-spoke or star network topology, vehicle 77 would have to be within range of a network coordinator 78 in order to transmit fuel level and location data to a host computer 79. Because the retail center is out of range of retail center 74, vehicle 77 could not benefit from the fuel delivery system described above. However, by embedding mobile transceivers in the wireless appliances of vehicles participating in the system and by using a mesh network 70 topology, it is possible to gain awareness of the fuel level of vehicle 77 and its location data despite the fact that vehicle 77 is out of range. Specifically, the data of vehicle 77 preferably propagates through network 70 by means of other vehicles participating in the system. Data transmission can occur as follows: vehicle 77 to vehicle 76, vehicle 76 to vehicle 75, vehicle 75 to stationary network node 71, stationary network node 71 to network coordinator 78, network coordinator 78 to host computer 79, host computer 79 to fuel tanker truck 80.

Using a mesh network 70 with mobile transceivers is advantageous for several reasons. First, the production cost of wireless appliances can be minimized (e.g., shorter-range radio frequency transceivers are much less expensive than cellular radios). Second, data transmission can occur across a wide geographic area without relying on access to expensive global system for mobile communications ("GSM") networks and code division multiple access ("CDMA") networks (i.e., users will not have monthly data usage fees). Third, network deployment costs can be minimized by reducing the need for stationary network nodes. Fourth, network coverage reliability will continue to increase as more users participate in the system.

Figure 6:
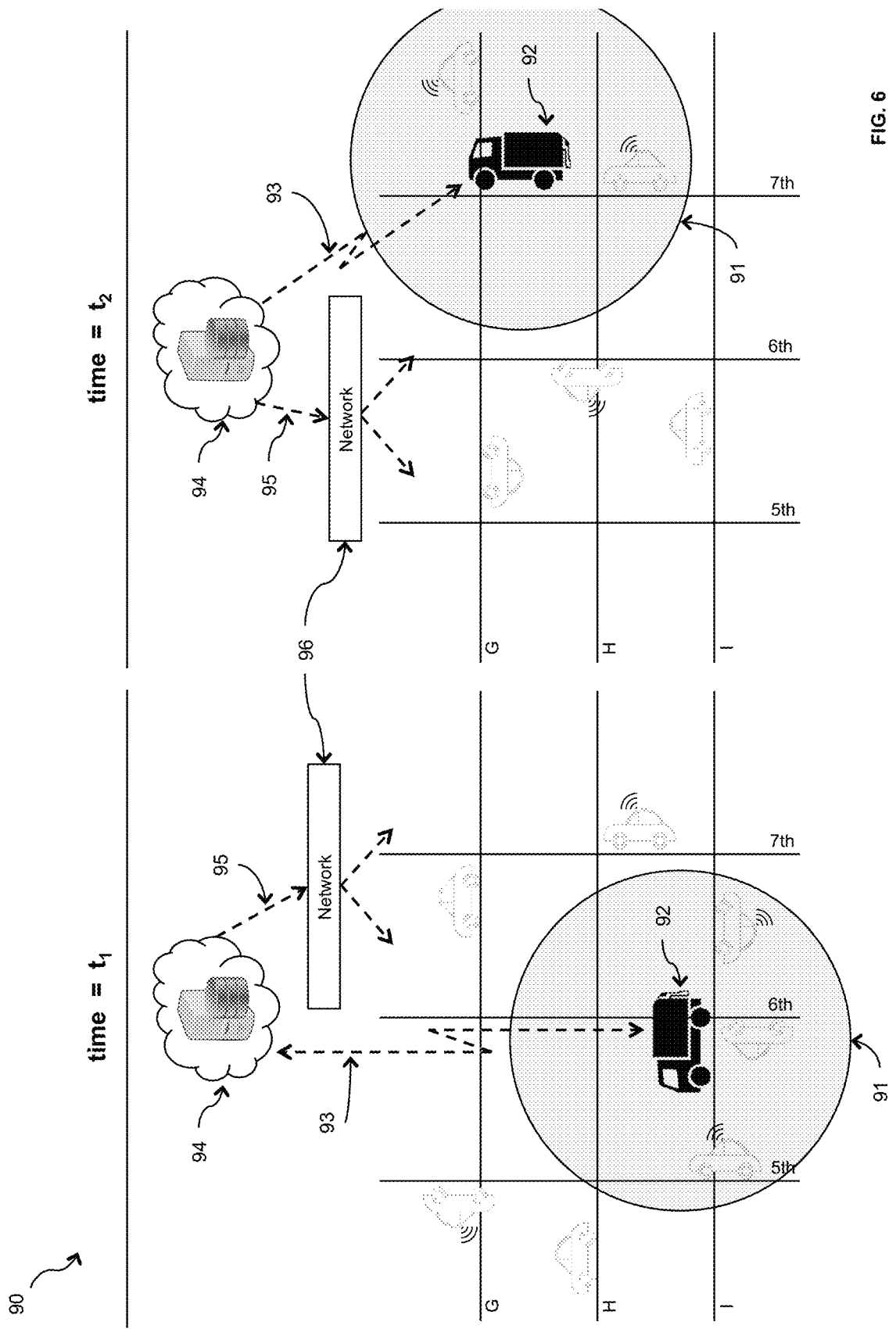
FIG. 6 illustrates a generalized system overview of a mobile geographic boundary.

FIG. 6 illustrates a schematic drawing of system 90 for varying geographic boundary 91 in connection with the location of mobile fuel tanker truck 92. Specifically, mobile fuel tanker truck 92 uploads real-time location data 93 to an Internet-connected database managed by host computer 94. Software running on the host computer 94 creates defined geographic boundary 91 around truck 92. If boundary 91 is a circle, it may be defined by a latitude/longitude coordinate pair and a radius of a given distance. Host computer 94 transmits coordinates 95 of boundary 91 through network 96. Depending on system architecture, boundary coordinates 95 may be transmitted to a wireless appliance (not shown) as described above and/or to a mobile application running on a user's smartphone (not shown). If the appliance or smartphone is within boundary 91, system 90 can interact with a vehicle or vehicle operator in numerous ways, including: dispatching fuel service to a vehicle, generating an alert message on a smartphone, and sending an email to a registered user.

Figure 7:
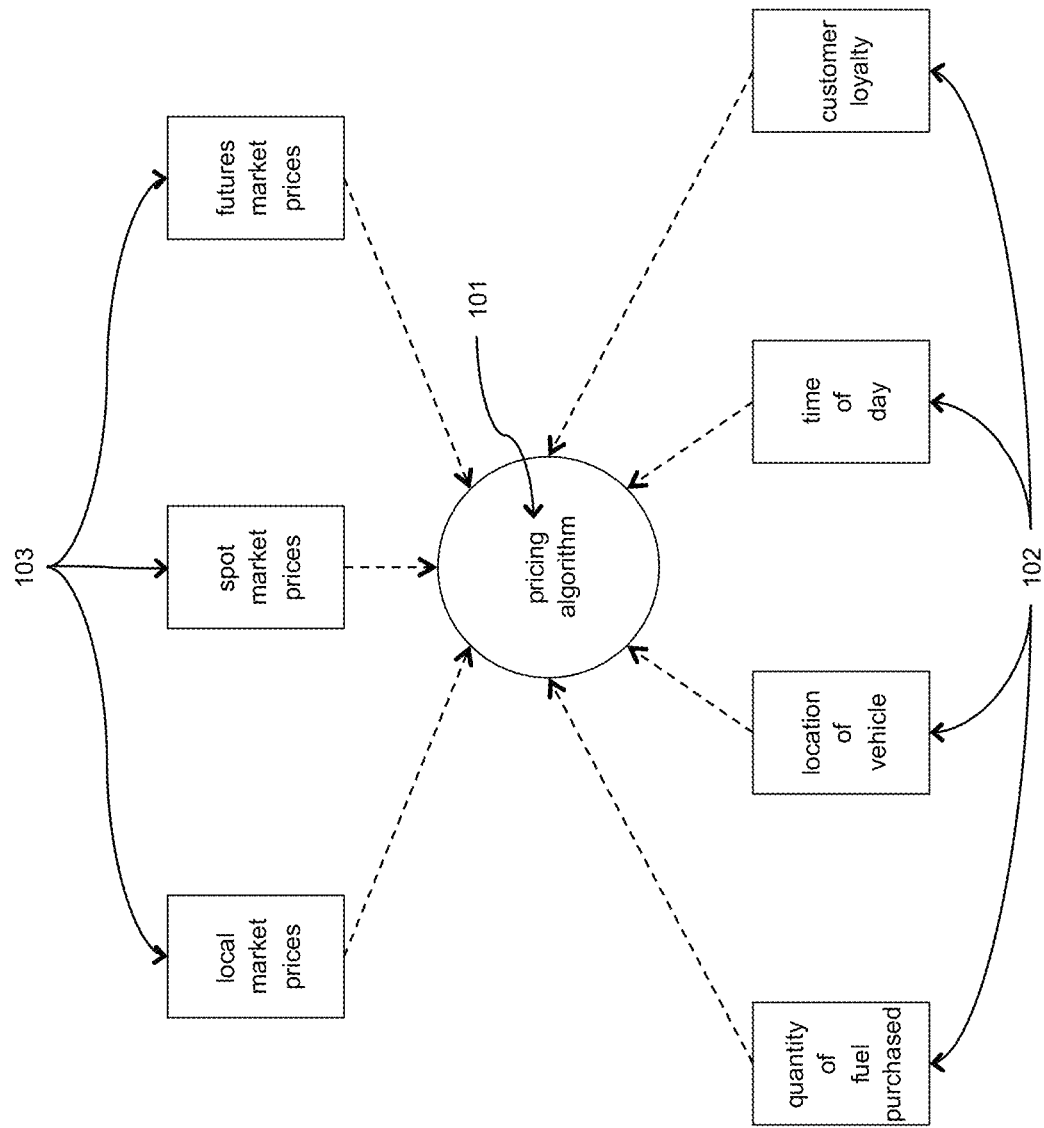
FIG. 7 shows some potential inputs to a fuel pricing algorithm.

FIG. 7 illustrates some potential inputs to fuel pricing algorithm 101. Specifically, it illustrates situation-specific factors 102 and real-time market factors 103 that can be incorporated into the algorithm to generate a fuel price. Currently, in the context of stationary refueling sites, it is impractical to adjust fuel prices in real-time. With a fuel delivery system as described above, a host computer can make automatic and instantaneous price adjustments based on numerous factors.

Figure 8:
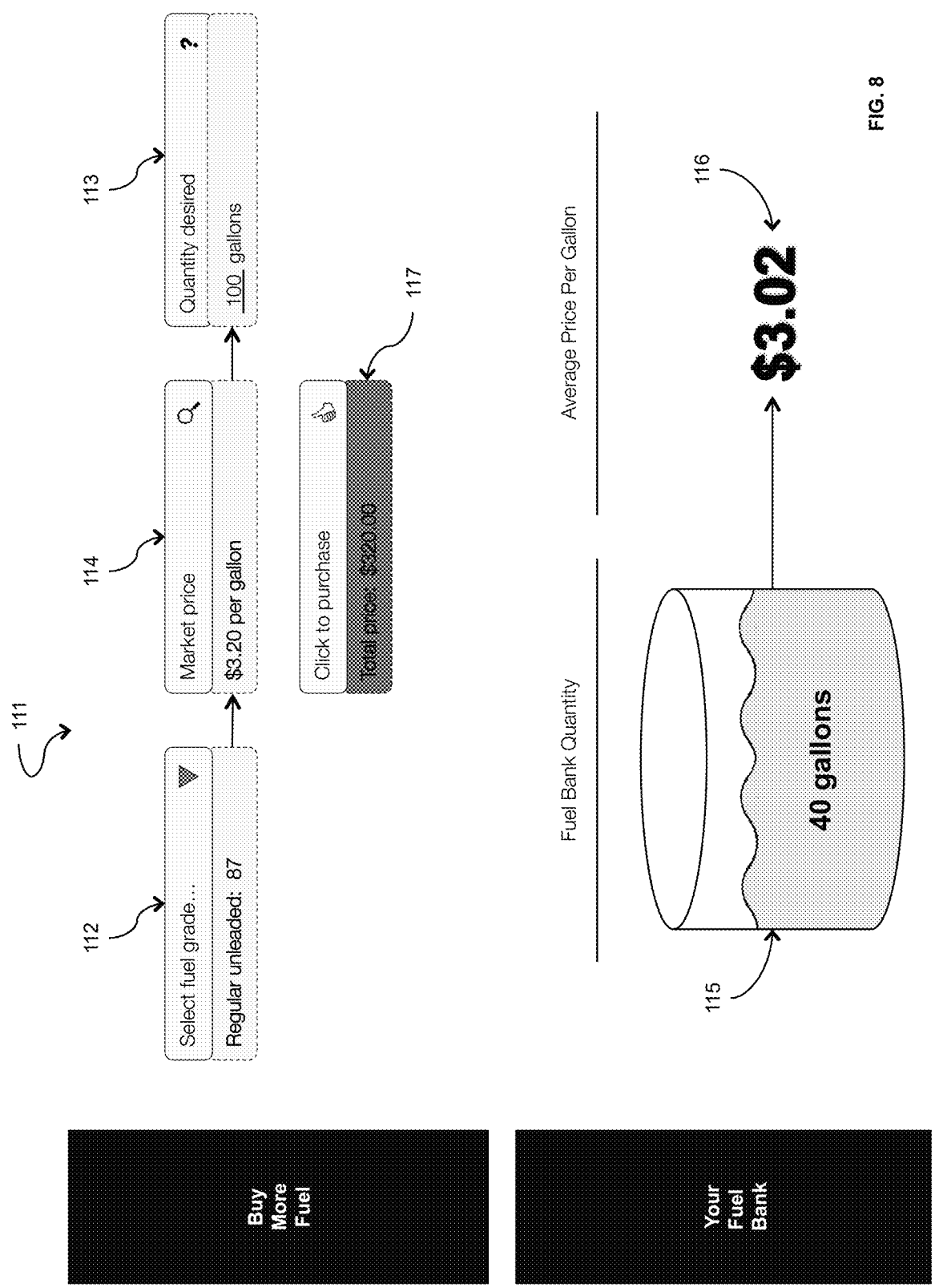
FIG. 8 shows a generalized fuel price hedging interface.

FIG. 8 illustrates a schematic drawing of a web-based or smartphone-based interface 111 for fuel price hedging. In rising fuel price environments, a typical vehicle operator is unable to stockpile large quantities of gasoline for future consumption. The systems and methods presented in this application allow for the purchase of a quantity of fuel, for future consumption, at present prices. Specifically, a vehicle operator can log into interface 111, select fuel grade 112 and quantity 113, and complete a fuel purchase at current market prices 114. Fuel quantity 113 of purchased can be then added to an operator's individual fuel bank 115. Future fuel deliveries to the vehicle operator will subtract from the fuel in the operator's fuel bank 115 and will be priced at the average price per gallon 116 of all fuel in the fuel bank 115. When a host computer (not shown) receives a fuel bank purchase 117 from a vehicle operator, the computer can initiate a corresponding and instantaneous spot market purchase to "lock in" price and ensure availability.

In one embodiment, the motorized vehicle does not include aircraft. In one embodiment, the motorized vehicle is a passenger vehicle. In one embodiment, the motorized vehicle is a fleet vehicle. In one embodiment, the motorized vehicle is a vehicle which is included within the Federal Highway Administration's thirteen-category classification scheme, including: motorcycles, passenger cars, pickups, panels, vans, buses, and two-to-six-axle trucks. In one embodiment, the motorized vehicle is not a land-based vehicle. In one embodiment, the motorized vehicle is a boat. In one embodiment, the vehicle is an aircraft.

In one embodiment, the invention relates to a system for determining location information by sending request messages and receiving response messages. Specifically, any participant in the system (e.g., a land-based computer, cloud-based computer, wireless appliance, smartphone, fuel tanker truck appliance, or third party monitoring agent) can be configured to initiate communication with any other participant in the system in order to solicit location information. The request message can be sent at periodic intervals and the response message can optionally be programmed to include GPS coordinates.

In another embodiment, a vehicle without a built-in wireless appliance can be located by tracking a vehicle operator's smartphone. Specifically, smartphone GPS coordinates can be periodically transmitted to a host computer in response to a communication received from therefrom, or as part of a smartphone-initiated transmission. Software installed on the host computer can cause the computer to use the coordinates to pinpoint the smartphone's location and analyze the change in coordinates over time to determine velocity. Significant changes in velocity can be analyzed to determine when the vehicle operator exits the vehicle (for example, the system can determine when a user is likely walking away from the vehicle because the cell phone that the user is carrying on his or her person is transmitting coordinates over time intervals that are consistent with a walking speed and not with a vehicle driving speed). Coordinates can then be "tracked back" from the continuing low-velocity path to the last known high-velocity location to identify where the vehicle is parked.

In one embodiment, the present invention relates to an automated fuel delivery system. Determination and communication of a user's need for fuel and the user's vehicle location can be achieved automatically in numerous manners. The present invention thus relates to any and all manners of wirelessly transmitting a vehicle's fuel level and location information to an external computer for the purpose of determining the proximity of a mobile fuel tanker truck and dispatching the tanker truck to refuel the vehicle.

In another embodiment, software running on a host computer can apply an algorithm to intelligently route a fuel tanker truck to a target vehicle's location. Specifically, the host computer can analyze the change in a target vehicle's location over time so as to determine whether the target is parked, moving, entering a service range, or exiting a service range. Multiple data points can be used to refine the algorithm, including historical travel patterns, time of day, average stationary time at known locations (e.g., shopping centers), combinations thereof, and the like.

In one embodiment, the present invention can include the ability to unlock fuel doors on vehicles for purposes of adding fuel to the vehicle's fuel tank when the vehicle owner is not present to unlock or otherwise open the fuel door. In this embodiment, if a tanker truck operator arrives at an unmanned vehicle that has a locked fuel door, an electronic signal or handheld apparatus can be provided to unlock and/or open the fuel door. For vehicles which have electronic locking fuel door mechanisms, such doors can optionally be unlocked by broadcasting the appropriate code from the wireless appliance to the OBD-II system. For vehicles which have mechanical locking fuel doors, such doors can be unlocked by with a handheld apparatus inserted along the door's edge.

Optionally, embodiments of the present invention can include a general or specific purpose computer or distributed system programmed with computer software implementing steps described above, which computer software may be in any appropriate computer language, including but not limited to C++, FORTRAN, BASIC, Java, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements. One or more processors and/or microcontrollers can operate via instructions of the computer code and the software is preferably stored on one or more tangible non-transitive memory-storage devices.

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all references, applications, patents, and publications cited above and/or in the attachments, and of the corresponding application(s), are hereby incorporated by reference.

The invention claimed is:

1. A method for automating the delivery of motor vehicle fuel wherein the need for motor vehicle user involvement is minimized, said method comprising:

providing a wireless appliance including a microcontroller, a GPS device, and a radio frequency transceiver in communication with on-board diagnostics of a motor vehicle, a fuel level sensor that communicates with at least one of the on-board diagnostics and the wireless appliance, a short-range wireless data communications module enabling communication with a client device and access to a remote server wherein said wireless appliance communicates with the remote server when the fuel level sensor detects that a fuel level drops below an established threshold in a fuel tank integrated in the motor vehicle and a request for refueling together with the location of the motor vehicle are also transmitted to the remote server via a wireless data communications network;

providing the remote server including access to a database, the remote server in wireless communication with the wireless appliance pluggable into an on-board diagnostics port of a motor vehicle, the wireless appliance providing access for the remote server via the on-board diagnostics port to at least one computer installed in the motor vehicle for obtaining data including a motor vehicle fuel level from the fuel level sensor and a motor vehicle location from said GPS device, wherein the remote server collects the data from the at least one computer installed in the motor vehicle;

the remote server comparing the data to a fuel level threshold stored in a profile within a database with respect to the motor vehicle and a geographic boundary limit for service provided by mobile fuel tanks indicating as available to refuel the motor vehicle;

the remote server notifying a user of the motor vehicle via an electronic message on a client device that a fuel service is being dispatched to the motor vehicle; and the remote server dispatching a mobile fuel tanker truck to the location of the motor vehicle when the fuel service is requested or accepted by the user of the motor vehicle via electronic message after the fuel level of the motor vehicle falls beneath the fuel level threshold.

2. The method of claim 1, further comprising the wireless appliance utilizing the client device within and/or otherwise associated with the motor vehicle, the client device including an application that enables communication with the computer to facilitate at least one of: monitoring the fuel level of the motor vehicle, alerting the user of the motor vehicle when the motor vehicle is within range of mobile fuel service, and providing the user of the motor vehicle with the ability to electronically place a fuel order for said motor vehicle.

3. The method of claim 1, further comprising the remote server comparing the location of the motor vehicle to a fixed or variable geographic service boundary to determine if a mobile fuel tank can be dispatched to the motor vehicle within the service boundary.

4. The method of claim 3, further comprising the remote server dispatching a mobile fuel tank to the motor vehicle location if a mobile fuel tank is available and providing the mobile fuel tank instructions including motor vehicle identification and location.

5. The method of claim 4, further comprising the remote server providing at least one of an electronic code or a manually entered code to an operator of the mobile fuel tank to unlock at least one of an electromechanically operated fuel door, an electromechanically operated fuel cap, a mechanically operated fuel door or a mechanically operated fuel cap associated with the motor vehicle.

6. The method of claim 1, further comprising the remote server receiving a quantity of fuel dispensed into the motor vehicle for bill processing.

7. The method of claim 1 wherein said data communications network comprises a mesh network.

8. The method of claim 1 wherein said data communications network comprises a cellular communications network.

9. The method of claim 2 wherein said application includes an interface for fuel price hedging.

10. The method of claim 1 wherein said fuel level sensor includes at least one variable resistor that changes a voltage of a sensor in response to a movement of a mechanical float located in said fuel tank of said vehicle.

11. A system for automating the delivery of motor vehicle fuel wherein the need for motor vehicle user involvement is minimized, said system comprising:

a wireless appliance including a microcontroller, a GPS device, and a radio frequency transceiver in communication with on-board diagnostics of a motor vehicle, a fuel level sensor that communicates with at least one of the on-board diagnostics and the wireless appliance, a short-range wireless data communications module enabling communication with a client device and access to a remote server wherein said wireless appliance communicates with the remote server when the fuel level sensor detects that a fuel level drops below an established threshold in a fuel tank integrated in the motor vehicle and a request for refueling together with the location of the motor vehicle are also transmitted to the remote server via a wireless data communications network;

the remote server providing access to a database, said remote server in wireless communication with the wireless appliance pluggable into an on-board diagnostics port of a motor vehicle, the wireless appliance providing access for the remote server via the on-board diagnostics port to at least one computer installed in the motor vehicle for obtaining data including a motor vehicle fuel level from the fuel level sensor and a motor vehicle location from said GPS device, wherein the remote server collects the data from the at least one computer installed in the motor vehicle;

wherein the remote server compares the data to a fuel level threshold stored in a profile within a database with respect to the motor vehicle and a geographic boundary limit for service provided by mobile fuel tanks indicating as available to refuel the motor vehicle;

wherein the remote server notifies a user of the motor vehicle via an electronic message on a client device that a fuel service is being dispatched to the motor vehicle; and wherein the remote server dispatches a mobile fuel tanker truck to the location of the motor vehicle when the fuel service is requested or accepted by the user of the motor vehicle via electronic message after the fuel level of the motor vehicle falls beneath the fuel level threshold.

12. The system of claim 11 wherein the wireless appliance utilizes the client device within and/or otherwise associated with the motor vehicle, the client device including an application that enables communication with the computer to facilitate at least one of:

monitoring the fuel level of the motor vehicle, alerting the user of the motor vehicle when the motor vehicle is within range of mobile fuel service, and providing the user of the motor vehicle with the ability to electronically place a fuel order for said motor vehicle.

13. The system of claim 11, wherein the remote server compares the location of the motor vehicle to a fixed or variable geographic service boundary to determine if a mobile fuel tank can be dispatched to the motor vehicle within the service boundary.

14. The system of claim 13, wherein the remote server dispatches a mobile fuel tank to the motor vehicle location if a mobile fuel tank is available and providing the mobile fuel tank instructions including motor vehicle identification and location.

15. The system of claim 14, wherein the remote server provides at least one of an electronic code or a manually entered code to an operator of the mobile fuel tank to unlock at least one of an electromechanically operated fuel door, an electromechanically operated fuel cap, a mechanically operated fuel door or a mechanically operated fuel cap associated with the motor vehicle.

16. The system of claim 11, further comprising the remote server receiving a quantity of fuel dispensed into the motor vehicle for bill processing.

17. The system of claim 11 wherein said data communications network comprises a mesh network.

18. The system of claim 11 wherein said data communications network comprises a cellular communications network.

19. The system of claim 12 wherein said application includes an interface for fuel price hedging.

20. The system of claim 11 wherein said fuel level sensor includes at least one variable resistor that changes a voltage of a sensor in response to a movement of a mechanical float located in said fuel tank of said vehicle.

* * * * *